US008115766B2

(12) United States Patent
Svakhine et al.

(10) Patent No.: US 8,115,766 B2
(45) Date of Patent: Feb. 14, 2012

(54) SYSTEM AND METHOD FOR RENDERING FLOW AND VOLUMES

(75) Inventors: Nikolai Svakhine, San Jose, CA (US); Yun Jang, West Lafayette, IN (US); David S. Ebert, West Lafayette, IN (US); Kelly P. Gaither, Austin, TX (US); Thomas Ertl, Stohrerweg (DE); Eduardo Tejada-Gamero, Schoenauer Strasse (DE)

(73) Assignee: Purdue Research Foundation, West Lafayette, IN (US)

( * ) Notice: Subject to any disclaimer, the term of this patent is extended or adjusted under 35 U.S.C. 154(b) by 1277 days.

(21) Appl. No.: 11/811,325

(22) Filed: Jun. 8, 2007

(65) Prior Publication Data

US 2008/0091395 A1    Apr. 17, 2008

Related U.S. Application Data

(60) Provisional application No. 60/812,317, filed on Jun. 9, 2006.

(51) Int. Cl.
*G06T 15/50* (2011.01)
*G06G 7/50* (2006.01)

(52) U.S. Cl. .......................................... 345/426; 703/9

(58) Field of Classification Search .................. 345/426; 703/9
See application file for complete search history.

(56) References Cited

OTHER PUBLICATIONS

Ebert et al., "Volume Illustration: Non-Photorealistic Rendering of Volume Models", Proceedings of IEEE Visualization '00, pp. 195-202.*
Meissner et al., "Pre-Integrated Non-Photorealistic Volume Rendering", Proceedings of VMV 2004, IEEE Computer Society, pp. 437-445.*
Telea et al., "3D IBFV Hardware-Accelerated 3D Flow Visualization", Proceedings of the 14th IEEE Visualization Conference (VIS'03), 2003, pp. 233-240.*
Wijk, "Image based Flow Visualization", ACM Transactions on Graphics 21, 32002, pp. 745-754.*
Wijk et al., "Three Ways to Show 3D Fluid Flow", IEEE, Sep. 1994.*

* cited by examiner

*Primary Examiner* — Jeffrey Chow
(74) *Attorney, Agent, or Firm* — Brinks Hofer Gilson & Lione

(57) ABSTRACT

A system and method for rendering flows and volumes includes the steps of generating a preintegrated table, the preintegrated table having a plurality of entries, each of the plurality of entries having color information and opacity information, generating illustrative effects based on the plurality of entries of the preintegrated table and displaying the illustrative effects.

6 Claims, 14 Drawing Sheets
(11 of 14 Drawing Sheet(s) Filed in Color)

SYSTEM AND METHOD FOR RENDERING FLOW AND VOLUMES

CROSS REFERENCE TO RELATED APPLICATION

This application claims priority to U.S. Provisional Application 60/812,317 entitled SYSTEM AND METHOD FOR RENDERING FLOWS AND VOLUMES, filed on Jun. 9, 2006, the entirety of which is herein incorporated by reference.

STATEMENT REGARDING FEDERALLY SPONSORED RESEARCH OR DEVELOPMENT

This invention was made with government support under Grant No. 0081581 and 0121288 awarded by the National Science Foundation. The government has certain rights in the invention.

BACKGROUND OF THE INVENTION

1. Field of the Invention

The preset invention generally relates to systems and method for rendering flows and volumes.

2. Description of the Known Technology

Flow simulations are used in different areas of science for various applications: from studying the flow around experimental aircrafts to analyzing cloud formation by air flow simulation. One critical, but difficult stage in the simulation process is analysis. Visualization is a key method for analyzing the simulation results and for providing meaningful feedback. As computational capabilities have increased in power and decreased in cost, the visualization community has faced significant challenges as the size, dimensionality and complexity of the simulation data has increased. Particularly, the simple step up from two-dimensional flow simulations to three-dimensional has rendered many existing flow visualizations techniques difficult to use. These techniques, when applied to three-dimensional flow data, tend to produce cluttered and hard-to-understand images.

In recent works, we have seen the dramatic use of illustrative techniques applied to three dimensional flow datasets. The usage of these illustrative effects has been very effective in removing the usual clutter associated with three-dimensional flow visualizations. However, the approach has been limited to regular rectangular grids because the data was being converted to three-dimensional textures and rendered using hardware accelerated texture-based volume rendering.

Flow visualization has received a lot of attention during past years, resulting in development of various techniques: vector glyphs, line integral convolution, texture advection and stream tracing (particle tracing, streamlines, and streaklines). While many of these techniques are effective for two-dimensional flows, the density of their representation often severely limits their effectiveness for three-dimensional flows, particularly in viscous flows and those containing boundary layers.

Illustration has also been considered as a viable approach to improve the understanding of flow volumes, showing the potential of applying volume illustration techniques to scalar flow volumes and streamlines. One recent achievement in computer graphics and visualization is the ability to render datasets interactively by utilizing the graphic processing units ("GPUs") on personal computer ("PC") graphics cards. A number of works have been focused on extending the existing techniques onto the GPUs.

Flow simulations very often produce regions in the volume that have finer grained detail than others. This is particularly true of viscous simulations or those that have boundary layer properties. For instance, we can be interested in the overall flow around an aircraft, but the particular details at the aircraft boundary are very important and need to be tracked. One common method for generating these simulations is by exploiting the positive aspects of non-regular grids. These grids allow small cells to be clustered in the boundary layer, and provide transitional cells to the far field where there is less need for fine grain detail and structure. Visualizing these grids, however, require methods that operate directly on the unstructured cells, rather than relying on resampling. Visualization techniques that operate on non-regular grids do not map directly to GPU textures. With general availability of graphics hardware acceleration, the respective works took advantage of GPU capabilities in the algorithm's implementation. The pre-integrated approach has improved the algorithm by using high-precision frame buffer blending].

However, these previous systems are limited to applying these techniques to uniform grids. Unstructured grids have emerged as a common basis for computing flow simulations. Therefore, there is a need for a system and method for applying and extending the flow illustration approach to tetrahedral meshes using pre-integrated GPU-accelerated raycasting.

SUMMARY OF THE INVENTION

In overcoming the enumerated drawbacks of the prior art, one embodiment of the present invention includes a general purpose computer having a processor and a display device. The processor of the general purpose computer has processor executable instructions for configuring the processor to generate a preintegrated table, the preintegrated table having a plurality of entries, each of the plurality of entries having color information and opacity information, generate illustrative effects based on the plurality of entries of the preintegrated table, and display the illustrative effects on the display device.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The patent or application file contains at least one color drawing executed in color. Copies of this patent or patent application publication with color drawings will be provided by the Office upon request and payment of the necessary fee.

DETAILED DESCRIPTION OF THE INVENTION

One embodiment of the present invention is based on pre-integrated volume rendering. This technique has been very useful in both texture-based volume rendering and tetrahedral mesh rendering. In this section, an overview of the hardware-accelerated raycasting algorithm and of the pre-integration method is produced. Next, described is the modifications introduced in these approaches to generate illustrative effects and show how they help gain insight into flow data.

Hardware-accelerated pre-integrated volume rendering precomputes the ray integral for each rendering primitive using the ray entry and exit point values ($s^{(f)}$, $s^{(b)}$), the thickness of the primitive l, and stores these in the table texture. During the rendering step, for each ray, the ($s^{(f)}$, $s^{(b)}$, l) values are extracted and used as indices for pre-integration table lookup. The implementation of volume rendering on regular grids using a two-dimensional pre-integration table, because the thickness of their rendering primitive (volume "slabs") is constant.

Figure 1:
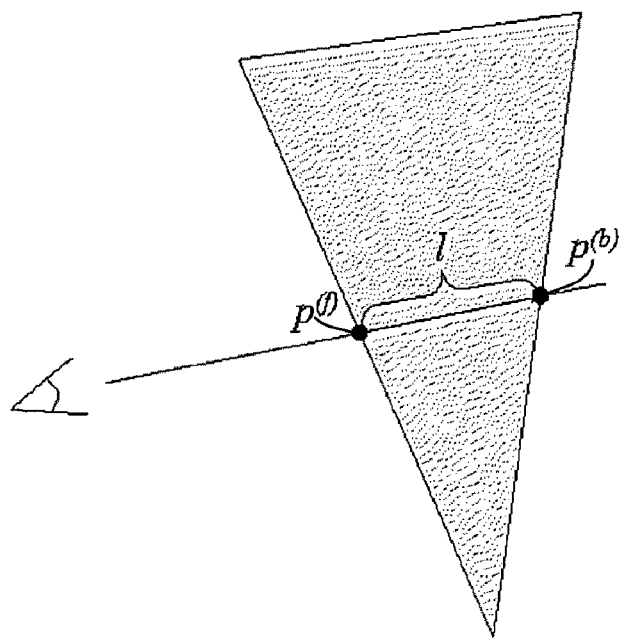
FIG. 1 illustrates a ray traversal for a tetrahedral raycaster a information gathered from a current tetrahedron.

Referring to FIG. 1, when raycasting tetrahedral meshes the pre-integration can be performed using three-dimensional pre-integrated tables, since the sample opacity depends on the thickness of the corresponding ray segment; i.e. the distance l between entry point ($p^{(f)}$) and exit point ($p^{(b)}$) for the current tetrahedron, as well as the values at these points $s^{(f)}$ and $s^{(b)}$ respectively.

The key difference for the illustrative effects described is the modification of this pre-integrated table. Described is a method showing how this modification is performed to obtain different effects. It is important to mention that, since most of the illustration techniques presented here is based on the gradient of the input data, gradient estimation is a major issue. Barycentric interpolation is utilized to estimate the gradient, obtaining good results despite the fact that the gradients thus obtained are constant within a tetrahedron. This is expected for datasets with good resolution where regions of interest are high-sampled. The illustrative effects introduced are accomplished either by modifying the shader or the pre-integrated table. The pre-integrated table is calculated from a transfer function indexed by a computed view-dependent value, e.g. view dependent gradient magnitude. This approach for silhouetting is described below.

Additionally, we introduce a different approach for illustrative effects based on gradient enhancement, silhouetting, curvature enhancement and banding by using the computed view-dependent value to modify the entries of the pre-integrated table calculated from a classic transfer function indexed by the input data. For that, a scaling mask m, which depends on the illustrative effect, is computed as described below and used to scale the extinction coefficient linearly to modify the associated color $C^{(m)}(s^{(f)}; s^{(b)}; l)$ and opacity $\alpha(s^{(f)}; s^{(b)}; l)$ stored at each entry ($s^{(f)}; s^{(b)}; l$) of the pre-integrated table. The masked opacity $\alpha^{(m)}(s^{(f)}; s^{(b)}; l)$ and the masked associated color $C^{(m)}(s^{(f)}; s^{(b)}; l)$ are obtained with Equations 1 and 2 respectively.

$$\alpha^{(m)}(s^{(f)}, s^{(b)}, l) = 1 - e^{(m \log(1 - \alpha(s^{(f)}, s^{(b)}, l)))}. \quad (1)$$

$$\tilde{C}^{(m)}(s^{(f)}, s^{(b)}, l) = \frac{\alpha^{(m)}(s^{(f)}, s^{(b)}, l)}{\alpha(s^{(f)}, s^{(b)}, l)} \tilde{C}(s^{(f)}, s^{(b)}, l). \quad (2)$$

Figure 2A:
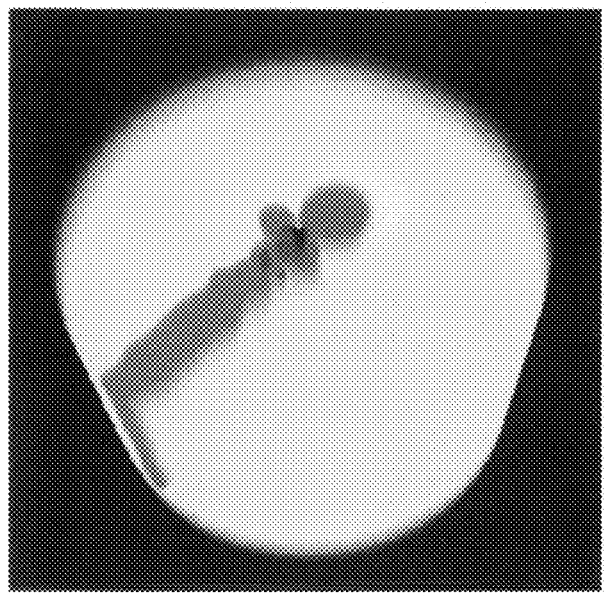
FIG. 2A-2F illustrate a gradient enhancement for a cylinder dataset.
Figure 2B:
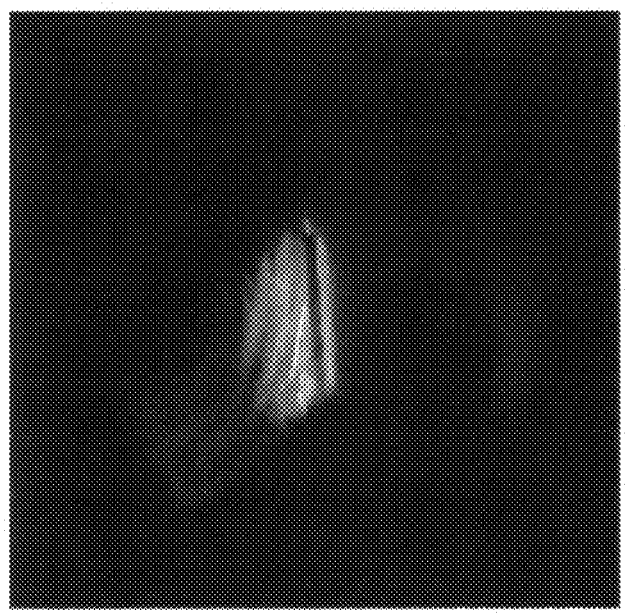
Figure 2C:
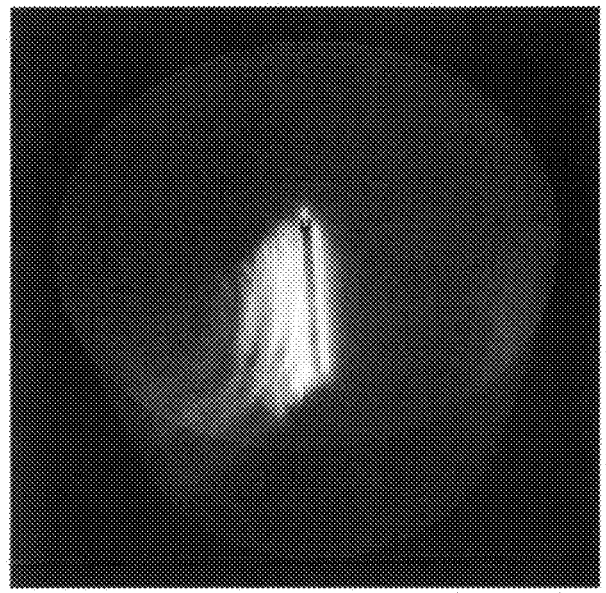
Figure 2D:
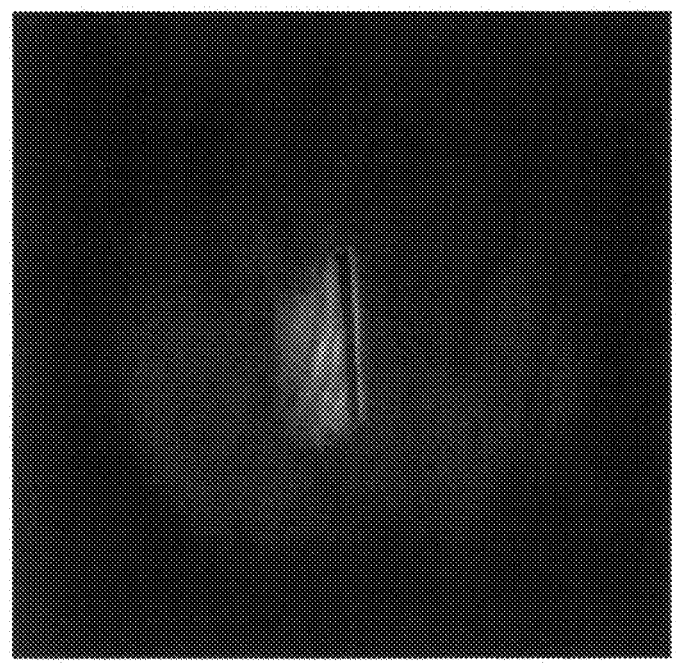
Figure 2E:
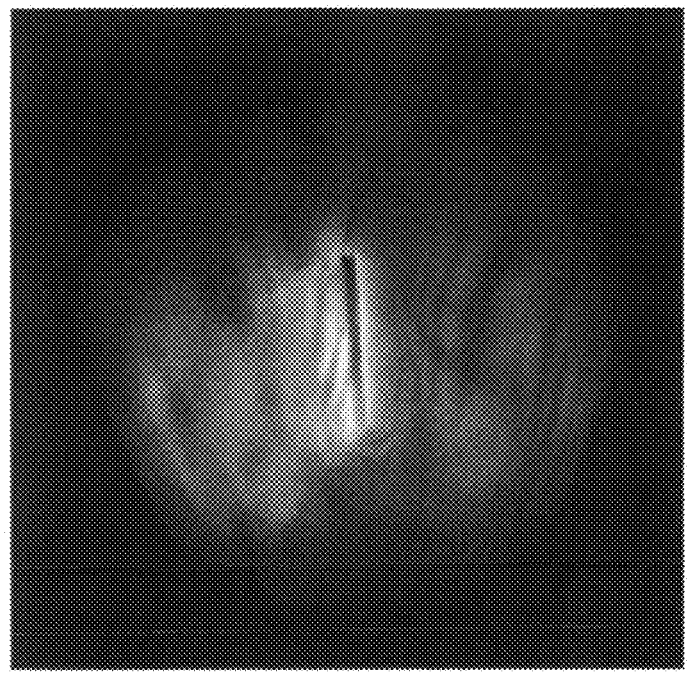
Figure 2F:
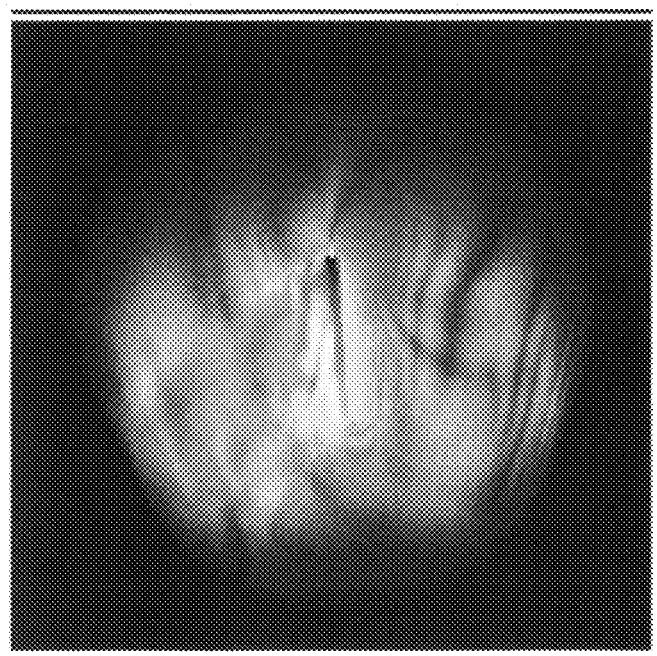
Figure 4A:
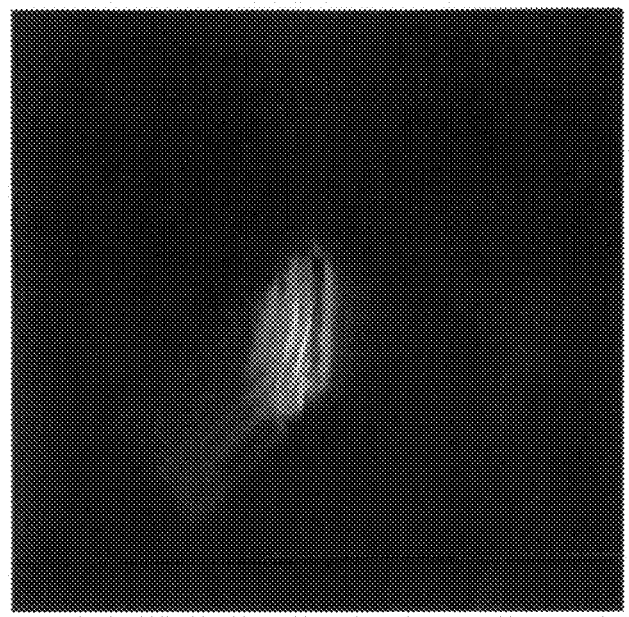
FIGS. 4A-4D illustrate masked silhouettes for the cylinder dataset.
Figure 4B:
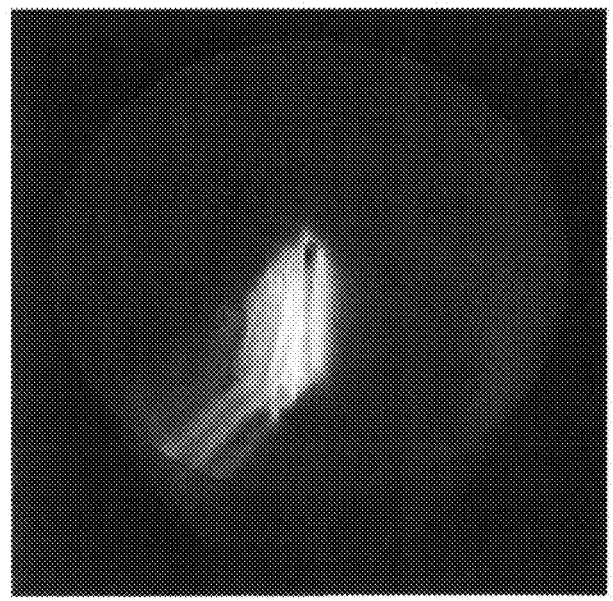
Figure 4C:
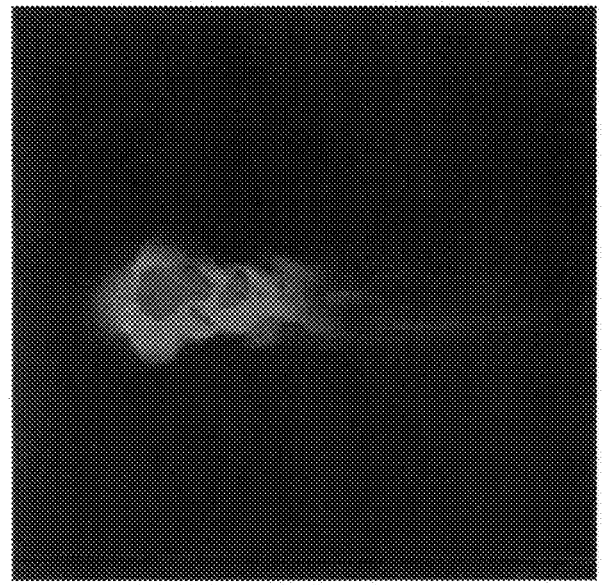
Figure 4D:
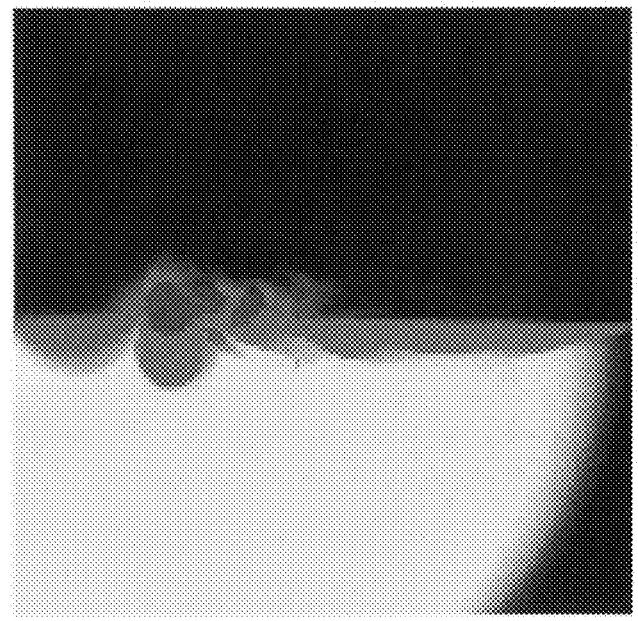

An illustrative effect can be achieved by masking the entries of the pre-integrated table using view-dependent gradient magnitudes. While not as accurate as the full gradient magnitude enhancement, it tends to highlight parts of essential high-gradient dataset features. Since the pre-integrated table is conveniently indexed by $s^{(f)}$, $s^{(b)}$ and l, for every entry in the table we can calculate view-dependent gradient magnitude and arbitrarily modify the color/opacity based on the value (e.g. gradient magnitude iso-lines, low gradient magnitude sample cull, negative gradient magnitude sample cull). For instance, given the approximated view-dependent gradient magnitude ($s^{(b)}$–$s^{(f)}$)/l, the mask m could be defined as $$\omega \left( \left| \frac{s^{(f)} - s^{(b)}}{l} \right| \right)^p, \quad (3)$$

where ω is an artificial used-defined opacity scaling factor and p is a scalar that controls how much the gradient magnitude affects the opacity of the pre-integrated table entry. FIGS. 2A-2E show the result of using this illustration technique on the Cylinder dataset. Notice that the same transfer function is used in all cases. FIGS. 2A-2C show volume rendering without illustration, gradient enhancement and gradient enhancement with highlighting of the surface, respectively. FIGS. 2D-2F gradient enhancement with different values of p.

Figure 3:
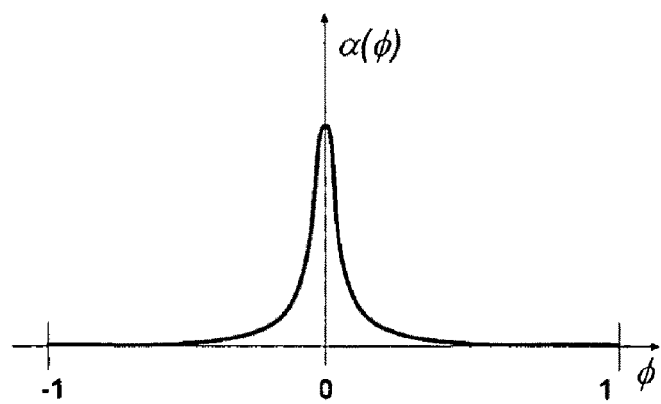
FIG. 3 illustrates an example of an opacity transfer function used in silhouette calculations.

A similar approach can be used for contour enhancement. As was originally presented in the work by Ebert and Rheingans, the contour/silhouette information can be extracted from the dataset by calculating φ=<n;v>, where n is the normalized gradient vector, v is the view vector and <·, ·> is the scalar product. A one-dimensional opacity transfer function α(φ) is then used to highlight areas where φ is close to 0 (the graph of an example of such function is shown in FIG. 3).

This filter shows only the samples where v and n are near orthogonal, which corresponds to a contour line of a surface, and works also rather well in volumes, where the normal vector n is approximated by 3D gradient vectors calculated from the original scalar field. These illustrative effects are shown in FIGS. 8A-8E. FIGS. 8A-8E show no illustration, banding, gradient enhancement, mixed silhouettes and volume rendering, and masked silhouettes, respectively.

Another way of obtaining gradient-based contours/silhouettes is by masking the entries of the pre-integrated table similarly to the view-dependent gradient enhancement effect. The mask m is obtained using the following formula $$g(\|\nabla f\|) \cdot (1 - |\phi|)^p, \quad (4)$$

where ∇f is the gradient and g(·) is a windowing function (usually a linear function clamped to [0;1]) used to restrict the detection of contours to the interfaces between different materials. Results obtained for the Cylinder dataset with this technique are shown in FIGS. 4A-4D. FIGS. 4A-4D show silhouettes, mixed silhouettes and surface rendering, top view of the silhouettes, top view of mixed silhouettes and volume rendering, respectively.

Curvature-based illustration is obtained by estimating the curvature for the segment between $s^{(f)}$ and $s^{(b)}$ as $\|(n^{(b)}-n^{(f)})=l\|$. The mask m used in this case is given by $$\omega\left(\frac{\|\vec{n}^{(f)}-\vec{n}^{(b)}\|}{l}\right)^p. \qquad (5)$$

Figure 5A:
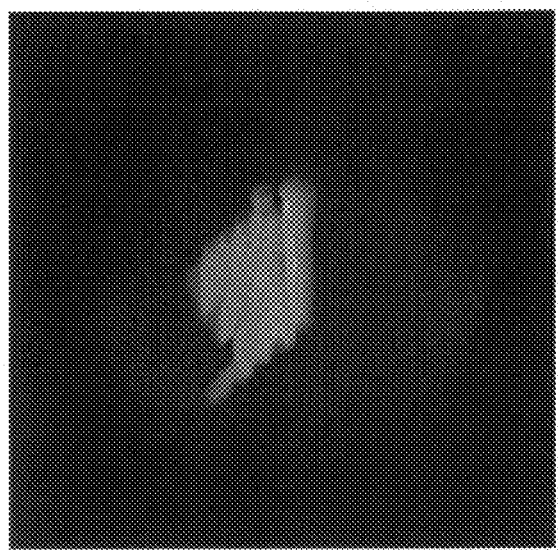
FIGS. 5A and 5B illustrate a curvature-based illustration for the cylinder dataset with two different p's.
Figure 5B:
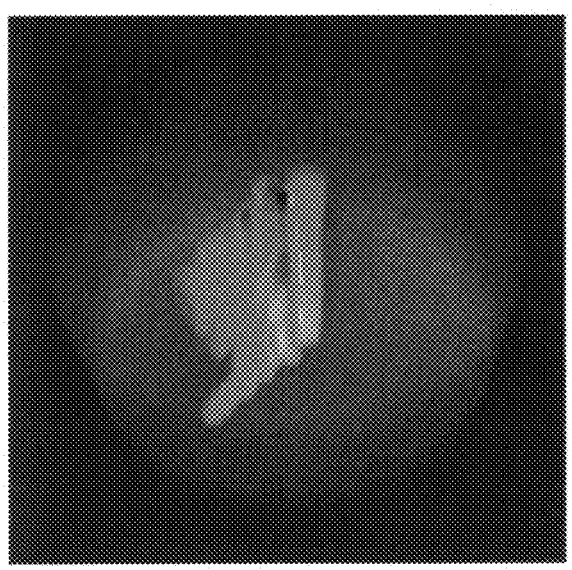

FIGS. 5A and 5B show visual results of this illustrative effect for the cylinder dataset with two different p's.

Figure 6A:
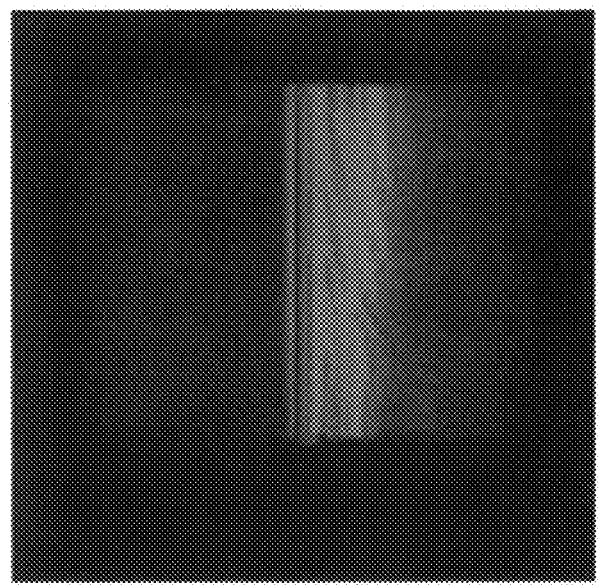
FIGS. 6A, 6B, and 6C illustrate banding of the scalar value of the cylinder dataset.
Figure 6B:
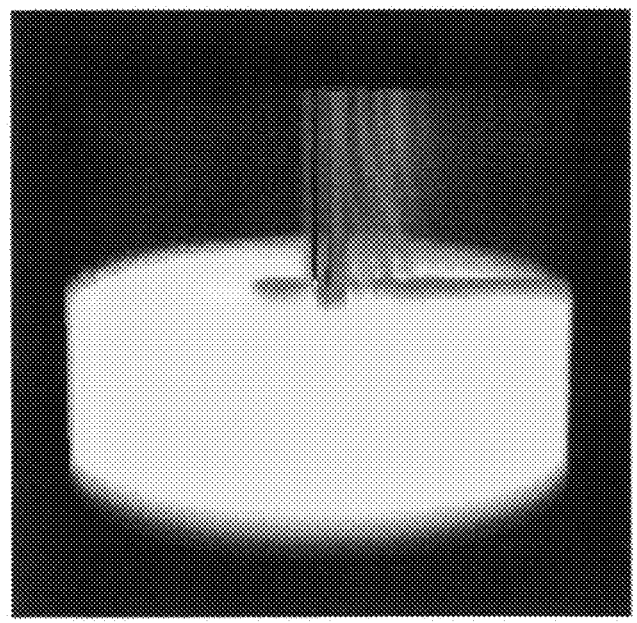
Figure 6C:
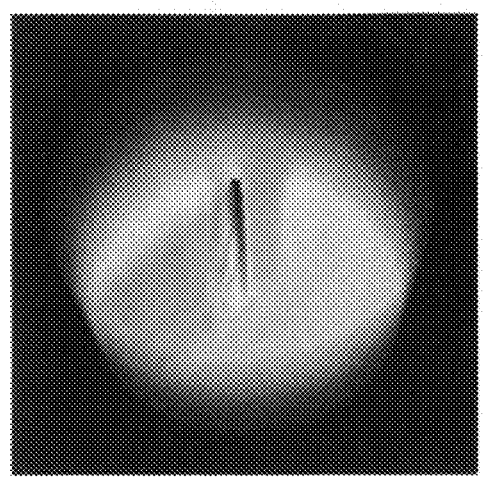

Banding is achieved by scaling the entries of the pre-integrated table with the mask:

$$\left(\frac{1+\sin(o_o \pi k)}{2}\right)^p. \qquad (6)$$

where $o_o$ is the value to mask (e.g. scalar value, gradient magnitude). FIGS. 6A and 6B show mixed banding and volume rendering and banding with lower p, respectively.

The implementation of our single-pass raycaster is modified to include the illustration techniques described above. As before, the data structure holding the tetrahedral mesh is stored in a set of textures used by the shader to calculate, for each iteration of the ray integral computation, the current tetrahedron and its entry and exit points. As in previous work the values at these points are interpolated from the values stored at the vertices of the tetrahedron using barycentric coordinates. The values obtained and the distance between the points are used to fetch the contribution of the ray segment to the ray integral from the pre-integrated table modified by our techniques. Also implemented may be the logarithmic sampling.

Figure 10:
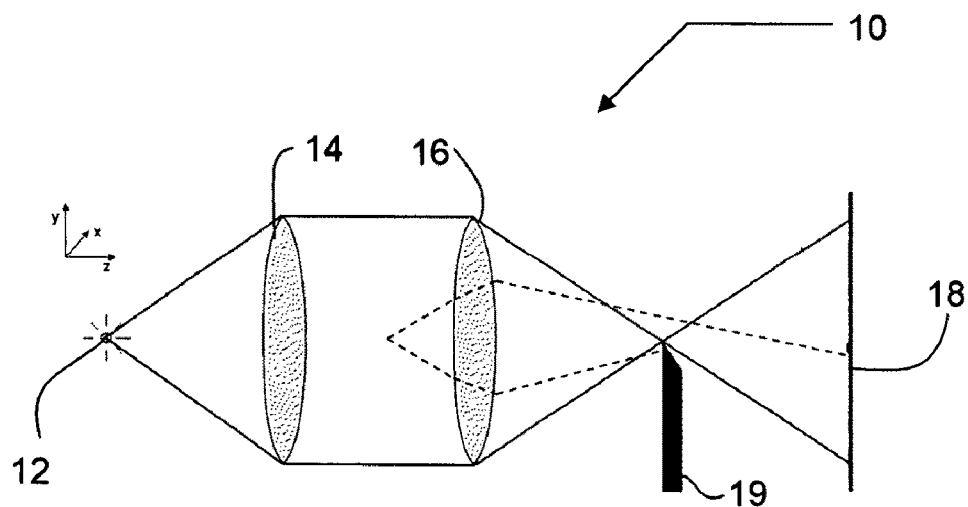
FIG. 10 is a block diagram of a Schlieren system.

Two other ways of rendering include the Schlieren and shadowgraph photographic processes. As shown in FIG. 10, the Schlieren photographic process uses an optical system 10 to capture density gradient variations in inhomogeneous media. When illuminated with a light source 12 that is made parallel by a first lens 14, the optical in homogeneities refract the light rays in proportion to the gradients of the refractive index projected by a second lens 16 on the xy-plane 18, which is orthogonal to the light direction. This refraction produces a two-dimensional displacement of the light ray (Equation 7), and the Schlieren knife edge apparatus 19 is able to measure this displacement's projection in a specific one dimensional direction on the xy-plane 18, called the knife edge angle, which is the main parameter of the process. Therefore, in classic Schlieren photographs, darker regions correspond to negative displacement, brighter regions correspond to positive displacement, and the knife-edge angle is usually chosen to provide the best visualization of particular features. Extensions of Schlieren techniques include using a circular cutoff that visualizes the displacement vector's magnitude, and color Schlieren photographs, that essentially create a "color-wheel" visualization of the displacement. Schlieren techniques have been developed for regular datasets, as well as unstructured datasets.

$$\vec{\varepsilon}=(\varepsilon_x, \varepsilon_y)=k\left(\int_{z_0}^{z_1}\frac{\partial\rho}{\partial x}dz, \int_{z_0}^{z_1}\frac{\partial\rho}{\partial y}dz\right) \qquad (7)$$

Figure 11:
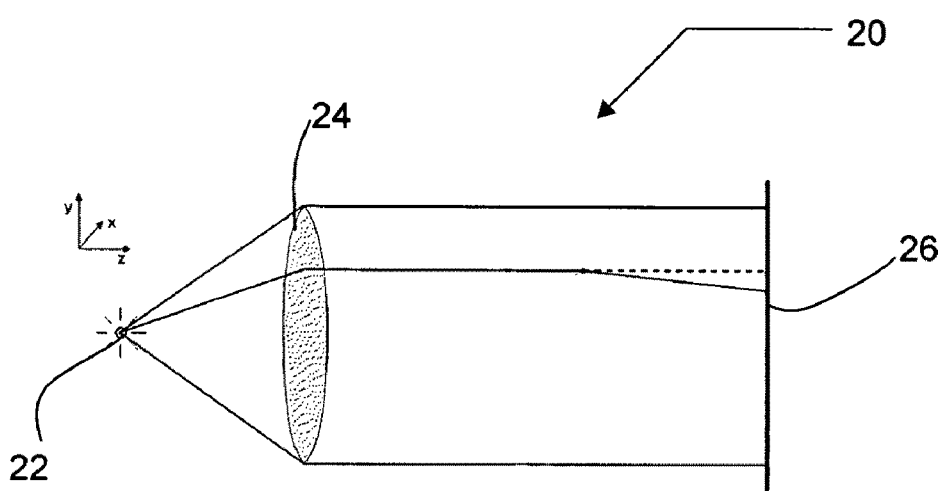
FIG. 11 is a block diagram of a shadowgraph system.

As shown in FIG. 11, the shadowgraph observation setup 20 is simpler, since it only contains a light source 22 made parallel by a lens 24, which is projected onto a screen 26. Due to in homogeneities in the test area, refraction within the affected region displaces the light ray before it reaches the screen, changing the luminance distribution on the screen. Note that this luminance shift only occurs when the displacement vector e along the x or y axes changes. Thus, the resulting luminance map value can be approximated by the following:

$$L=\int_{z_0}^{z_1}\left(\frac{\partial\varepsilon_x}{\partial x}+\frac{\partial\varepsilon_y}{\partial y}\right)dz=\int_{z_0}^{z_1}\left(\frac{\partial\rho^2}{\partial x^2}+\frac{\partial\rho^2}{\partial y^2}\right)dz \qquad (8)$$

Interactive Schlieren computer visualizations of three-dimensional flows have not been produced, although some commercial packages incorrectly refer to boundary enhancement as Schlieren results. We have extended our texture-based volume rendering system to simulate and enhance the Schlieren and shadowgraph techniques. The Schlieren integral is calculated using two rendering passes. In the first pass, slice rendering performs the integration of the separate components of the displacement vector e and stores them in the R and G components of a floating-point pixel buffer. Since the classic Schlieren setup places the light source directly behind the test area, we use front-to-back slicing to integrate along the light path. Note that this integral of positive and negative displacements allows them to cancel out their effects as in the experimental Schlieren system. For visualization of two-dimensional datasets and single slice visualization, only a single slice is rendered in this pass. The second pass transforms the displacement vector map to the actual image, scaling the resulting color by the sensitivity coefficient, s, according to the particular Schlieren method we want to simulate: knife-angle cutoff (Equation 9, where k is a normal to the knife edge), or circular cutoff:

$$I=s\frac{(1+(\vec{\varepsilon}\cdot\vec{k}))}{2} \qquad (9)$$

$$I=s|\vec{\varepsilon}| \qquad (10)$$

The shadowgraph integral (Equation 7) is computed analogously, except that the value of L is scalar. Therefore, during the second rendering pass, the calculations simplify to the following:

$$I=s\frac{(1+L)}{2} \qquad (11)$$

The most obvious and important limitation of the classic Schlieren photographic approach is that the experimental apparatus does not allow flexible control over which portion of the data is photographed: it always covers the entire test area, thus lacking the ability to focus on a particular location. There is active research in physics to extend the classic Schlieren approach and construct more complicated apparatuses to overcome these limitations. Our Schlieren renderer, however, allows us to easily filter the data according to the value or location, using regular transfer functions and distance-based transfer functions during the first pass, thus overcoming these obstacles and producing improved Schlieren images.

Depending on the illustration technique applied to the data, modifications to the raycaster can be introduced either in the pre-integrated table computation or in the shader. These modifications are described in the following.

Gradient enhancement: As described above, view dependent gradient enhancement is achieved by scaling each entry of the pre-integrated table using Equations 7 and 8 and the mask given by Equation 9. Therefore, the only modification to the raycaster is introduced after computing the pre-integrated table, where a function that scales the opacity of each entry of the table is called.

Silhouettes: A pre-integrated table is calculated as usual but instead of using the interpolated values $s^{(f)}$ and $s^{(b)}$ at the entry and exit points respectively to perform the color and opacity fetch, a pre-integrated table indexed by $(\phi^{(f)}; \phi^{(b)}; 1)$. The shader is then modified to calculate and use $(\phi^{(f)}; \phi^{(b)}; 1)$ as indices to the pre-integrated table lookup. Since the gradient is constant within a tetrahedron, we take the gradient of the current tetrahedron as $\phi^{(f)}$ and the gradient of the next intersected tetrahedron as $\phi^{(b)}$. Alternatively, gradients can be pre-computed at the vertices, interpolate them on the face (in the shader stage), normalize them, and then project them onto the view direction to obtain more accurate results.

Masked silhouettes: Another approach we used to generate silhouettes from the gradient information is simply masking the color and opacity stored in the pre-integrated table, as done for the gradient enhancement. For that we use the mask given by Equation 4. However, since $\phi$ can only be calculated in the fragment shader, the masking takes places during rendering using Equations 1 and 2.

Curvature-based: As in the case of gradient-based masked contour effects (masked silhouettes) the mask in this case can be calculated only during rendering. Therefore, we follow the same approach and modify the shader to use Equations 1 and 2 to apply the mask given by Equation 5.

Banding: Banding is achieved by masking the entries of the pre-integrated table using the mask given by Equation 6. As in the case of gradient enhancement, this process occurs right after computing the pre-integrated table. Thus, no modification is introduced into the rendering process.

Figure 12:
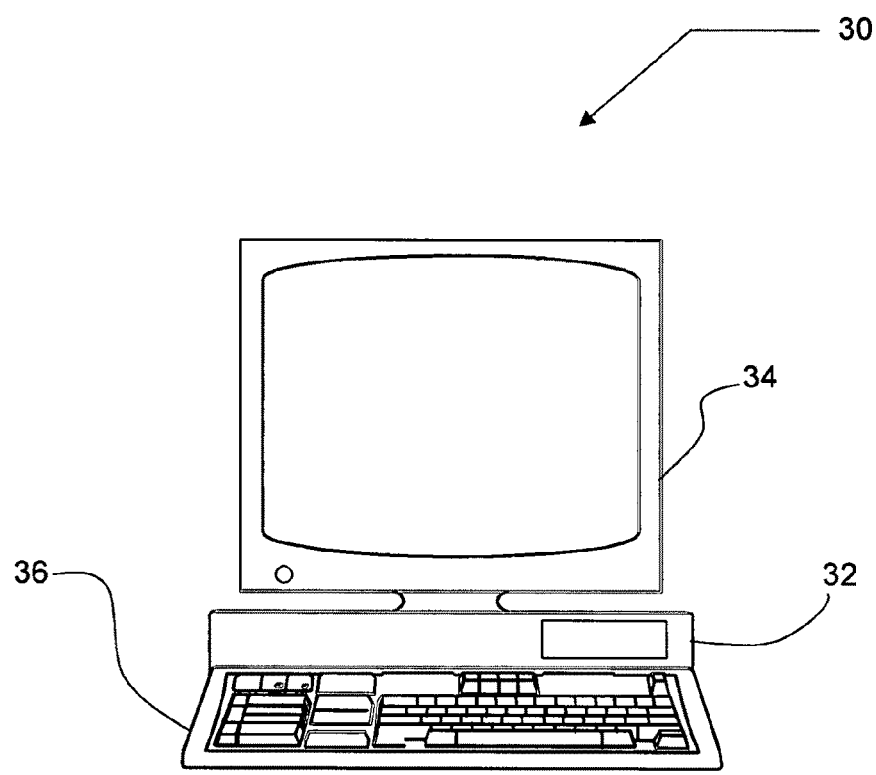
FIG. 12 is a block diagram of a general purpose computer capable of executing a method for rendering flows and volumes.

Referring to FIG. 12, a system 30 for executing the methods discussed in the previous paragraphs is shown. The system 30, includes a general purpose computer 32, a display 34 and at least one input device such as a keyboard 36 and/or a mouse 38. The general purpose computer 32 may include a graphics processing unit such as an NVidia GeForce 7800 gtx (512 MB) graphics card. The general purpose computer 32 is configured to execute the methods described in the previous paragraphs. As such, any visual displays created by the methods discussed in the previous paragraphs are displayed on the display 34.

Table 1 shows the performance results for the illustration techniques presented. We notice that the performance change is depreciable even for datasets with millions of tetrahedra.

TABLE 1

Performance in frames per second for the test datasets with the illustration techniques presented.

| | Bluntfin | Comb. | Cylinder | Shock |
|---|---|---|---|---|
| Num. tetrahedra | 187395 | 215040 | 624960 | 1923048 |
| Vol. rendering | 6.69 | 4.74 | 5.09 | 2.88 |
| Grad. enhance. | 6.56 | 4.68 | 5.12 | 2.99 |
| Curvature-based | 6.92 | 5.26 | 4.96 | 2.51 |
| Banding | 6.56 | 4.68 | 5.12 | 2.24 |
| Silhouettes | 6.74 | 5.02 | 4.98 | 2.94 |
| Masked silh. | 6.21 | 4.99 | 5.05 | 2.78 |

Also, we can see that, although the Cylinder dataset is larger than the Combustion Chamber dataset, the performance is almost the same. This is probably due to the projected size in pixels of the volume and the early ray termination included in the fragment shader which causes a decrease in the processing time when the opacity is increased. It is worth mentioning, that for the performance measurements we employed the transfer functions used to generate the figures included in this paper.

Figure 7A:
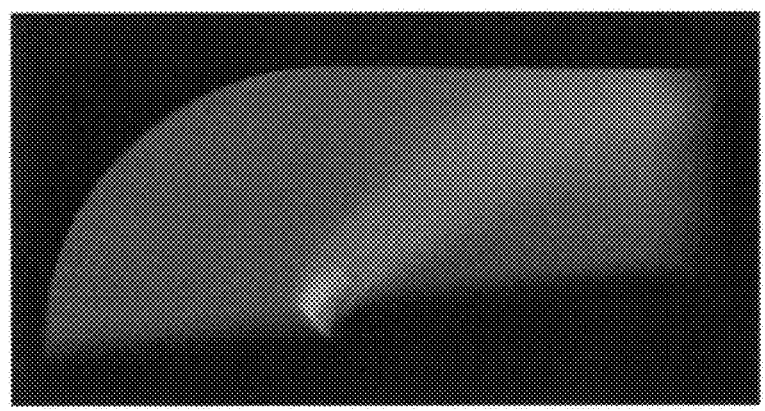
FIGS. 7A and 7B illustrate a volume rendering and gradient enhancement for the Bluntfin dataset, respectively.
Figure 7B:
Figure 8A:
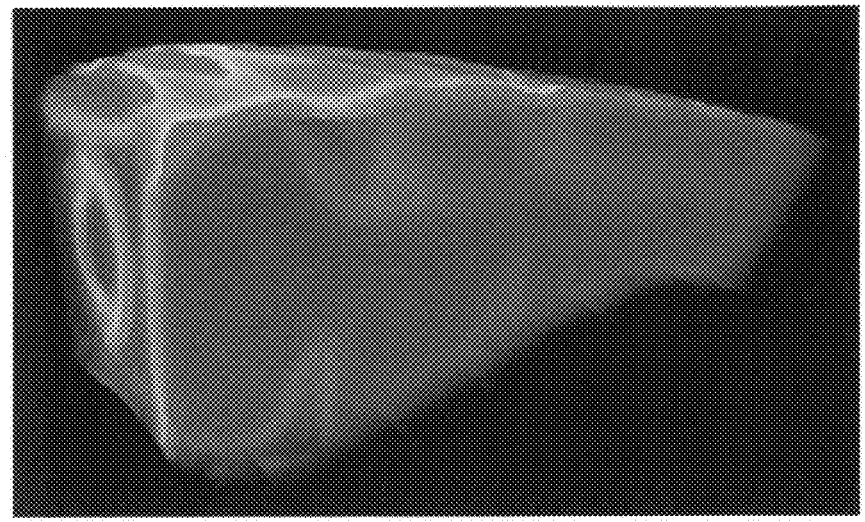
FIGS. 8A-8E illustrate the effects for the Combustion Chamber dataset.
Figure 8B:
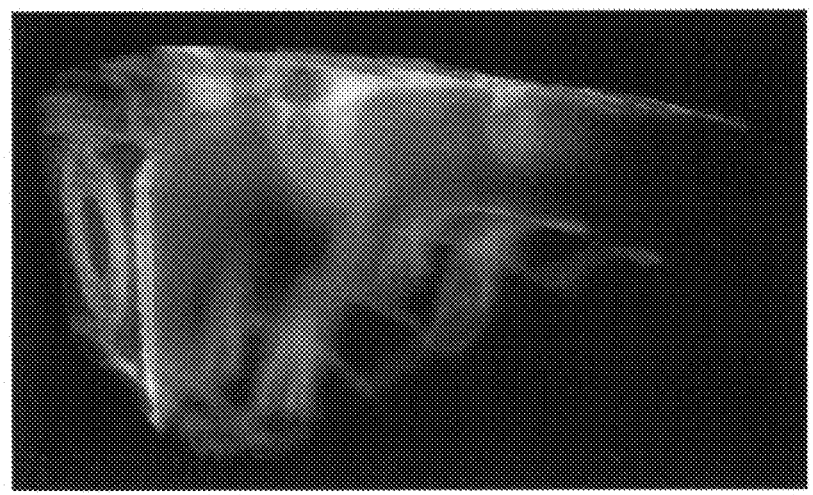
Figure 8C:
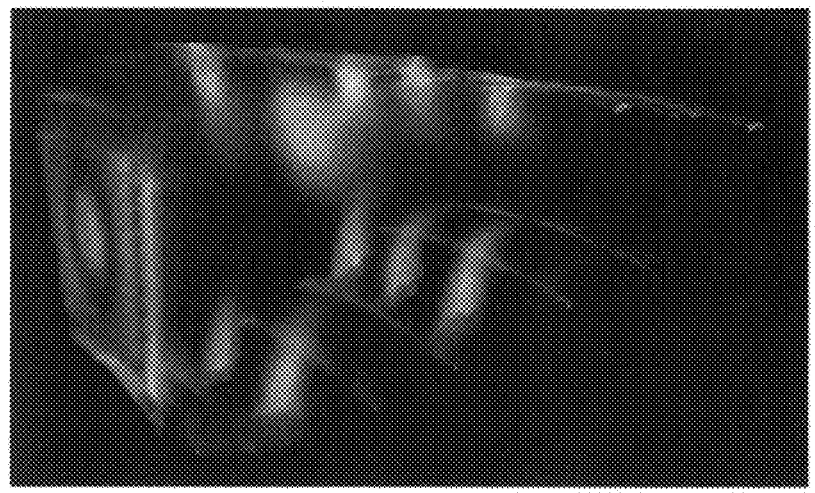
Figure 8D:
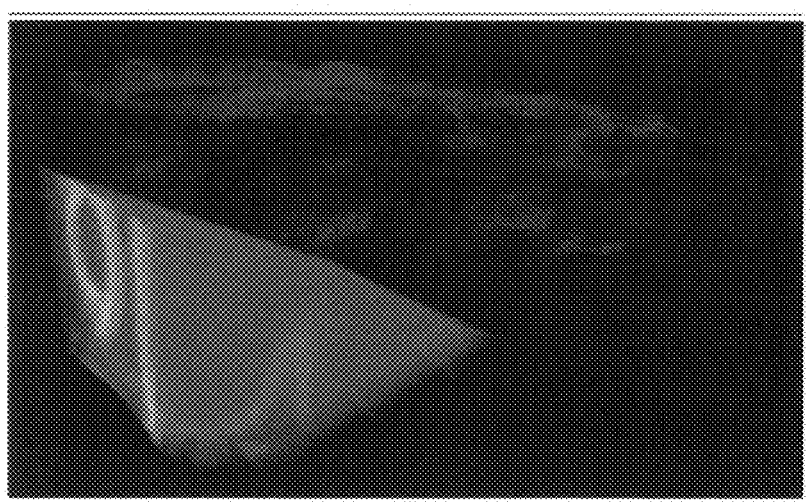
Figure 8E:
Figure 9A:
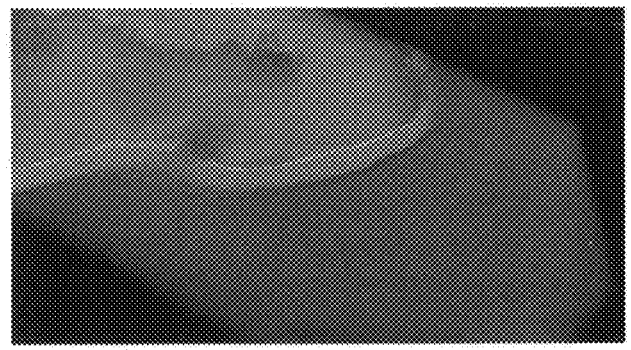
FIGS. 9A and 9B illustrates a shock dataset.
Figure 9B:
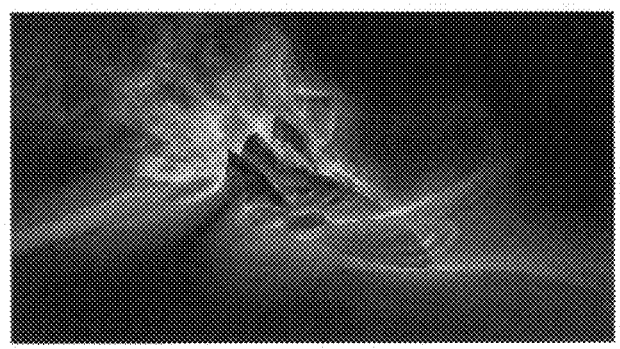

From the set of figures shown above, we can see that flow structures can be extracted from the data using the illustrative effects described. It is important to notice that this is not true for each and every dataset, as depicted in FIGS. 7A and 7B, which illustrate a volume rendering and gradient enhancement for the Bluntfin dataset, respectively. However, for the case of the Cylinder (FIGS. 2-6), Combustion Chamber (FIGS. 8A and 8B) and Shock (FIGS. 9A and 9B) dataset, flow structures were extracted by applying illustrative effects without needing to spend much time in finding a proper transfer function, as is generally needed with normal volume rendering.

Volume illustration applied to flow datasets helps gain insight into the structures contained in the flow data. The problem of employing illustration techniques was approached only for flow datasets on regular grids. However, there are a significant number of simulations that are computed on unstructured grids. Previous work took a shortcut to skirt this problem by resampling the parts of the flow datasets onto a regular grid.

Applying illustrative effects directly to tetrahedral grids makes the investigation of such datasets easier. Although we have shown how these effects can be applied to such grids, there are still issues to be solved, such as a semiautomatic setting of the parameters used for each technique, and the removing of artifacts that arise due to the constant gradient within each tetrahedron.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A method for rendering a flow and a volume, the method being executed by a processor and comprising the steps of:
generating with the processor a preintegrated table, the preintegrated table having a plurality of entries, each of the plurality of entries having color information and opacity information;
generating with the processor illustrative effects based on the plurality of entries of the preintegrated table;
displaying on a display coupled to the processor the illustrative effects, wherein the illustrative effects illustrate flow information and volume information;
wherein the step of generating illustrative effects further comprises the step of masking the plurality of entries of the preintegrated table using view dependent gradient magnitudes; and
wherein the step of masking the plurality of entries of the preintegrated table further comprises the step of scaling each entry of the plurality of entries of the preintegrated table using the equation:

$$\omega\left(\left|\frac{s^{(f)}-s^{(b)}}{l}\right|\right)^p,$$

where ω is an artificial user-defined opacity scaling factor, p is a scalar that controls how much the gradient magnitude affects the opacity of each the plurality of entries of the preintegrated table, and l is a distance between an entry point $s^{(f)}$ of a ray passing though the volume and an exit point $s^{(b)}$ of the ray passing through the volume.

2. A method for rendering flows and volumes, the method being executed by a processor and comprising the steps of:
generating with the processor a preintegrated table, the preintegrated table having a plurality of entries, each of the plurality of entries having color information and opacity information;
generating with the processor illustrative effects based on the plurality of entries of the preintegrated table;
displaying on a display coupled to the processor the illustrative effects, wherein the illustrative effects illustrate flow information and volume information;
wherein the step of generating illustrative effects further comprises the step of masking the color information and the opacity information; and
wherein the step of masking the plurality of entries of the preintegrated table further comprises the step of scaling the color information and the opacity information for each entry of the plurality of entries of the preintegrated table using the equation:

$$g(\|\nabla f\|)\cdot(1-|\phi|)^p,$$

where ∇f is a gradient, g(·) is a windowing function, p is a scalar that controls how much the gradient magnitude affects the opacity of each the plurality of entries of the preintegrated table, and φ=<n;v>, where n is a normalized gradient vector and v is a view vector of a contour or silhouette of a flow and volume;
wherein n is calculated using a gradient estimation algorithm based on the gradient of the preintegrated table and
wherein the gradient ∇f restricts the detection of contours to interface between different materials.

3. A method for rendering flows and volumes, the method being executed by a processor and comprising the steps of:
generating with the processor a preintegrated table, the preintegrated table having a plurality of entries, each of the plurality of entries having color information and opacity information;
generating with the processor illustrative effects based on the plurality of entries of the preintegrated table;
displaying on a display coupled to the processor the illustrative effects, wherein the illustrative effects illustrate flow information and volume information;
wherein the step of generating illustrative effects further comprises the step of scaling the plurality of entries of the preintegrated table; and
wherein the step of scaling the plurality of entries of the preintegrated table uses the equation:

$$\left(\frac{1+\sin(o_o\pi k)}{2}\right)^p$$

where $o_o$ is a value to mask, k is a constant, and p is a scalar that controls how much the gradient magnitude affects the opacity of each the plurality of entries of the preintegrated table; and
wherein the value to mask is a scalar value or a gradient magnitude of the illustrative effects.

4. A system for rendering a flow and a volume volumes, the system comprising:
a general purpose computer having a processor;
a display device in communication with the general purpose computer;
the processor of the general purpose computer having processor executable instructions for configuring the processor to generate a preintegrated table, the preintegrated table having a plurality of entries, each of the plurality of entries having color information and opacity information, generate illustrative effects based on the plurality of entries of the preintegrated table, and display the illustrative effects on the display device, wherein the illustrative effects illustrate flow information and volume information;
wherein the processor comprises processor executable instruction for configuring the processor to mask the plurality of entries of the preintegrated table using view dependent gradient magnitudes; and
wherein the processor comprises processor executable instruction for configuring the processor to scale each entry of the plurality of entries of the preintegrated table using the equation:

$$\omega\left(\left|\frac{s^{(f)}-s^{(b)}}{l}\right|\right)^p,$$

where ω is an artificial user-defined opacity scaling factor, p is a scalar that controls how much the gradient magnitude affects the opacity of each the plurality of entries of the preintegrated table, and l is a distance between an entry point $s^{(f)}$ of a ray passing though the volume and an exit point $s^{(b)}$ of the ray passing though the volume.

5. A system for rendering flows and volumes, the system comprising:
a general purpose computer having a processor;
a display device in communication with the general purpose computer;
the processor of the general purpose computer having processor executable instructions for configuring the processor to generate a preintegrated table, the preintegrated table having a plurality of entries, each of the plurality of entries having color information and opacity information, generate illustrative effects based on the plurality of entries of the preintegrated table, and display the illustrative effects on the display device, wherein the illustrative effects illustrate flow information and volume information;
wherein the processor comprises processor executable instruction for configuring the processor to mask the color information and the opacity information;
wherein the processor comprises processor executable instruction for configuring the processor to mask the plurality of entries of the preintegrated table by scaling the color information and the opacity information for each entry of the plurality of entries of the preintegrated table using the equation:

$$g(\|\nabla f\|)\cdot(1-|\phi|)^p,$$

where ∇f is a gradient, g(·) is a windowing function, p is a scalar that controls how much the gradient magnitude affects the opacity of each the plurality of entries of the preintegrated table, and φ=<n;v>, where n is a normalized gradient vector and v is a view vector;
wherein n is calculated using a gradient estimation algorithm based on the gradient of the preintegrated table and
wherein the gradient ∇f restricts the detection of contours to interface between different materials.

6. A system for rendering flows and volumes, the system comprising:
a general purpose computer having a processor;
a display device in communication with the general purpose computer;
the processor of the general purpose computer having processor executable instructions for configuring the processor to generate a preintegrated table, the preintegrated table having a plurality of entries, each of the plurality of entries having color information and opacity information, generate illustrative effects based on the plurality of entries of the preintegrated table, and display the illustrative effects on the display device, wherein the illustrative effects illustrate flow information and volume information;
wherein the processor comprises processor executable instruction for configuring the processor to scale the plurality of entries of the preintegrated table;
wherein the processor comprises processor executable instruction for configuring the processor to scale the plurality of entries of the preintegrated table using the equation:

$$\left(\frac{1+\sin(o_o \pi k)}{2}\right)^p$$

where $o_o$ is the value to mask, k is a constant, and p is a scalar that controls how much the gradient magnitude affects the opacity of each the plurality of entries of the preintegrated table; and
wherein the value to mask is a scalar value or a gradient magnitude of the illustrative effects.

* * * * *